(12) United States Patent
Odinak et al.

(10) Patent No.: US 8,379,802 B2
(45) Date of Patent: *Feb. 19, 2013

(54) SYSTEM AND METHOD FOR TRANSMITTING VOICE INPUT FROM A REMOTE LOCATION OVER A WIRELESS DATA CHANNEL

(75) Inventors: Gilad Odinak, Bellevue, WA (US); Thomas R. McCann, North Bend, WA (US); Julien Rivarol Vergin, Seattle, WA (US)

(73) Assignee: Intellisist, Inc., Bellevue, WA (US)

( * ) Notice: Subject to any disclaimer, the term of this patent is extended or adjusted under 35 U.S.C. 154(b) by 180 days.

This patent is subject to a terminal disclaimer.

(21) Appl. No.: 12/829,820

(22) Filed: Jul. 2, 2010

(65) Prior Publication Data

US 2010/0274562 A1    Oct. 28, 2010

Related U.S. Application Data

(63) Continuation of application No. 11/929,458, filed on Oct. 30, 2007, now Pat. No. 7,769,143.

(51) Int. Cl.
*H04M 1/64* (2006.01)

(52) U.S. Cl. ............. 379/88.01; 455/563; 704/231; 704/270

(58) Field of Classification Search ............. 379/88.01, 379/406.01, 406.03; 455/563; 704/270.1, 704/270, 231, 253, 246, 275, 248
See application file for complete search history.

(56) References Cited

U.S. PATENT DOCUMENTS

| | | | |
|---|---|---|---|
| 4,001,505 A * | 1/1977 | Araseki et al. | 704/246 |
| 4,052,568 A | 10/1977 | Jankowski | |
| 4,625,083 A | 11/1986 | Poikela | |
| 4,630,304 A | 12/1986 | Borth et al. | |
| 4,759,212 A | 7/1988 | Sawada et al. | |
| 4,827,500 A | 5/1989 | Binkerd et al. | |
| 4,876,710 A | 10/1989 | Reed et al. | |
| 4,878,170 A | 10/1989 | Zeevi | |
| 4,918,732 A | 4/1990 | Gerson et al. | |
| 5,012,518 A | 4/1991 | Liu et al. | |
| 5,029,233 A | 7/1991 | Metroka | |

(Continued)

FOREIGN PATENT DOCUMENTS

| | | |
|---|---|---|
| DE | 19516647 | 11/1996 |
| EP | 0829704 | 3/1998 |

(Continued)

OTHER PUBLICATIONS

Zhao, Yilin, Efficient and reliable data transmission for cellular and GPS based mayday systems, Intelligent Transportation System, 1997. ITSC'97, IEEE Conference, pp. 555-559, Nov. 9-12, 1997, Boston, MA, USA, entire document.

(Continued)

*Primary Examiner* — Olisa Anwah
(74) *Attorney, Agent, or Firm* — Scott Born Foster Pepper PLLC

(57) ABSTRACT

A system and method for improving voice recognition processing at a server system that receives voice input from a remotely located user system. The user system includes a microphone, a processor that performs front-end voice recognition processing of the received user voice input, and a communication component configured to send the front-end processed user voice input to a destination wirelessly over a network. The server system includes a communication component configured to receive the sent front-end processed user voice input, and a processor configured to complete voice recognition processing of the sent front-end processed user voice input.

6 Claims, 4 Drawing Sheets

U.S. PATENT DOCUMENTS

| | | | |
|---|---|---|---|
| 5,062,132 A | 10/1991 | Yasuda et al. | |
| 5,148,471 A | 9/1992 | Metroka et al. | |
| 5,168,277 A | 12/1992 | LaPinta et al. | |
| 5,259,018 A | 11/1993 | Grimmett et al. | |
| 5,263,181 A | 11/1993 | Reed | |
| 5,357,513 A | 10/1994 | Kay et al. | |
| 5,371,901 A | 12/1994 | Reed et al. | |
| 5,414,624 A | 5/1995 | Anthonyson | |
| 5,539,810 A | 7/1996 | Kennedy, III et al. | |
| 5,564,796 A | 10/1996 | Saito et al. | |
| 5,570,087 A | 10/1996 | Lemelson | |
| 5,649,055 A | 7/1997 | Gupta et al. | |
| 5,668,854 A | 9/1997 | Minakami et al. | |
| 5,712,788 A | 1/1998 | Liaw et al. | |
| 5,719,921 A | 2/1998 | Vysotsky et al. | |
| 5,729,531 A | 3/1998 | Raith et al. | |
| 5,732,074 A | 3/1998 | Spaur et al. | |
| 5,749,072 A | 5/1998 | Mazurkiewicz | |
| 5,761,638 A | 6/1998 | Knittle et al. | |
| 5,777,580 A | 7/1998 | Janky et al. | |
| 5,805,079 A | 9/1998 | Lemelson | |
| 5,835,868 A | 11/1998 | McElroy et al. | |
| 5,835,881 A | 11/1998 | Trovato et al. | |
| 5,867,780 A | 2/1999 | Malackowski et al. | |
| 5,870,667 A | 2/1999 | Globuschutz | |
| 5,877,723 A | 3/1999 | Fan | |
| 5,937,355 A | 8/1999 | Joong et al. | |
| 5,940,481 A | 8/1999 | Zeitman | |
| 5,940,503 A | 8/1999 | Palett et al. | |
| 5,943,429 A | 8/1999 | Handel | |
| 5,945,985 A | 8/1999 | Babin et al. | |
| 5,946,343 A | 8/1999 | Schotz et al. | |
| 5,956,683 A | 9/1999 | Jacobs et al. | |
| 5,960,399 A | 9/1999 | Barclay et al. | |
| 5,963,861 A | 10/1999 | Hanson | |
| 6,006,148 A | 12/1999 | Strong | |
| 6,011,786 A | 1/2000 | Dent | |
| 6,019,475 A | 2/2000 | Lynam et al. | |
| 6,037,880 A | 3/2000 | Manion | |
| 6,044,266 A | 3/2000 | Kato | |
| 6,052,604 A | 4/2000 | Bishop, Jr. et al. | |
| 6,076,057 A * | 6/2000 | Narayanan et al. | 704/256.2 |
| 6,085,428 A | 7/2000 | Casby et al. | |
| 6,105,060 A | 8/2000 | Rothblatt | |
| 6,111,539 A | 8/2000 | Mannings et al. | |
| 6,111,964 A | 8/2000 | Ishibashi | |
| 6,125,284 A | 9/2000 | Moore et al. | |
| 6,128,482 A | 10/2000 | Nixon et al. | |
| 6,151,539 A | 11/2000 | Bergholz et al. | |
| 6,154,658 A | 11/2000 | Caci | |
| 6,154,662 A | 11/2000 | Norton et al. | |
| 6,157,317 A | 12/2000 | Walker | |
| 6,161,071 A | 12/2000 | Shuman et al. | |
| 6,163,752 A | 12/2000 | Sievers et al. | |
| 6,199,013 B1 | 3/2001 | O'Shea | |
| 6,202,008 B1 | 3/2001 | Beckert et al. | |
| 6,206,283 B1 | 3/2001 | Bansal et al. | |
| 6,208,927 B1 | 3/2001 | Mine et al. | |
| 6,212,473 B1 | 4/2001 | Stefan et al. | |
| 6,233,452 B1 | 5/2001 | Nishino | |
| 6,240,365 B1 | 5/2001 | Bunn | |
| 6,243,003 B1 | 6/2001 | DeLine et al. | |
| 6,249,233 B1 | 6/2001 | Rosenberg et al. | |
| 6,275,231 B1 | 8/2001 | Obradovich | |
| 6,279,946 B1 | 8/2001 | Johnson et al. | |
| 6,282,430 B1 | 8/2001 | Young | |
| 6,292,781 B1 | 9/2001 | Urs et al. | |
| 6,296,280 B1 | 10/2001 | Struble et al. | |
| 6,308,126 B2 | 10/2001 | Yokoyama et al. | |
| 6,317,684 B1 | 11/2001 | Roeseler et al. | |
| 6,334,089 B2 | 12/2001 | Hessing | |
| 6,336,090 B1 | 1/2002 | Chou et al. | |
| 6,349,329 B1 | 2/2002 | Mackintosh et al. | |
| 6,351,698 B1 | 2/2002 | Kubota et al. | |
| 6,353,785 B1 | 3/2002 | Shuman et al. | |
| 6,363,324 B1 | 3/2002 | Hildebrant | |
| 6,370,237 B1 | 4/2002 | Schier | |
| 6,370,506 B1 | 4/2002 | Ahluwalia | |
| 6,374,214 B1 | 4/2002 | Friedland et al. | |
| 6,377,210 B1 | 4/2002 | Moore | |
| 6,389,332 B1 | 5/2002 | Hess et al. | |
| 6,389,389 B1 | 5/2002 | Meunier et al. | |
| 6,393,403 B1 | 5/2002 | Majaniemi | |
| 6,405,027 B1 | 6/2002 | Bell | |
| 6,408,272 B1 | 6/2002 | White et al. | |
| 6,421,607 B1 | 7/2002 | Gee et al. | |
| 6,441,790 B1 | 8/2002 | Forrester et al. | |
| 6,453,020 B1 | 9/2002 | Hughes et al. | |
| 6,484,174 B1 | 11/2002 | Wall et al. | |
| 6,487,402 B1 | 11/2002 | Faus et al. | |
| 6,487,494 B2 | 11/2002 | Odinak et al. | |
| 6,496,776 B1 | 12/2002 | Blumberg | |
| 6,496,799 B1 | 12/2002 | Pickering | |
| 6,516,466 B1 | 2/2003 | Jackson | |
| 6,526,335 B1 | 2/2003 | Treyz et al. | |
| 6,526,486 B2 | 2/2003 | Theimer | |
| 6,615,381 B1 | 9/2003 | Fukuda et al. | |
| 6,628,928 B1 | 9/2003 | Crosby et al. | |
| 6,671,617 B2 | 12/2003 | Odinak et al. | |
| 6,765,497 B2 | 7/2004 | Ablay et al. | |
| 6,779,196 B1 | 8/2004 | Igbinadolor | |
| 6,810,323 B1 | 10/2004 | Bullock et al. | |
| 6,868,385 B1 * | 3/2005 | Gerson | 704/275 |
| 6,885,735 B2 | 4/2005 | Odinak | |
| 6,895,238 B2 | 5/2005 | Newell et al. | |
| 7,769,143 B2 | 8/2010 | Odinak et al. | |
| 2001/0010500 A1 | 8/2001 | Lundin et al. | |
| 2001/0014863 A1 | 8/2001 | Williams, III | |
| 2001/0016500 A1 | 8/2001 | Son et al. | |
| 2001/0020211 A1 | 9/2001 | Takayama et al. | |
| 2001/0021646 A1 | 9/2001 | Antonucci et al. | |
| 2001/0030598 A1 | 10/2001 | Deline et al. | |
| 2001/0033643 A1 | 10/2001 | Mulvey et al. | |
| 2002/0028655 A1 | 3/2002 | Rosener et al. | |
| 2002/0065037 A1 | 5/2002 | Messina et al. | |
| 2002/0068543 A1 | 6/2002 | Shah | |
| 2002/0069071 A1 | 6/2002 | Knockeart et al. | |
| 2002/0075168 A1 | 6/2002 | Ablay et al. | |
| 2002/0103639 A1 | 8/2002 | Chang et al. | |
| 2002/0111172 A1 | 8/2002 | DeWolf et al. | |
| 2002/0113203 A1 | 8/2002 | Heslin et al. | |
| 2002/0140545 A1 | 10/2002 | Nietupski et al. | |
| 2002/0142803 A1 | 10/2002 | Yamamoto | |
| 2002/0143999 A1 | 10/2002 | Yamagami | |
| 2002/0158753 A1 | 10/2002 | DeLine et al. | |
| 2002/0173347 A1 | 11/2002 | Kinnunen | |
| 2003/0169160 A1 | 9/2003 | Rodriguez et al. | |
| 2004/0110515 A1 | 6/2004 | Blumberg et al. | |
| 2005/0028208 A1 | 2/2005 | Ellis et al. | |
| 2008/0021707 A1 * | 1/2008 | Bou-Ghazale et al. | 704/248 |

FOREIGN PATENT DOCUMENTS

| | | |
|---|---|---|
| FR | 02762906 | 11/1998 |
| JP | 04219783 | 8/1992 |
| JP | 07159186 | 6/1995 |
| JP | 08044996 | 2/1996 |
| WO | WO9909374 | 2/1999 |

OTHER PUBLICATIONS

Nusser, et al., Bluetooth-based wireless connectivity in an automatic environment, Vehicular Technology Conference, 2000. IEEE-VTS, Fall VTC 200. 52nd, pp. 2541-2548, vol. 6, Sep. 24-28, 2000. Boston, MA. USA. entire document.

Stirling, A., Mobile multimedia platforms, Vehicular Technology Conference, 2000. IEEE-VTS Fall VTC 200. 52nd, pp. 2541-2548, vol. 6, Sep. 24-28, 2000, Boston, MA, USA, entire document.

Jameel, et al., Interest multimedia on wheels: connecting cars to cyberspace, Intelligent Transportation System, 1997. ITSC'97, IEEE Conference, pp. 637-642, Nov. 9-12, 1997, Boston, MA. USA. entire document.

Kushner, et al., Effects of subtractive-type speech enhancement/ noise reduction algorithms on parameter estimation for improved recognition and coding in high noise environments, vol. 1, ICASSP-89, May 23-26, 1989, pp. 211-221.

Boll, Steven F., Supression of acoustic noise in speech using spectral subtraction, IEEE Transaction on ASSP, vol. ASSP-2 No. 2, Apr. 1979.

Un and Choi, Improving LPC analysis of noisy speech by autocorrelation subtraction method, ICASSP 81 Proceedings, Mar. 30-Apr. 1, 1981, pp. 1082-1085.

* cited by examiner

US 8,379,802 B2

SYSTEM AND METHOD FOR TRANSMITTING VOICE INPUT FROM A REMOTE LOCATION OVER A WIRELESS DATA CHANNEL

PRIORITY CLAIM

This application is a continuation of U.S. application Ser. No. 11/929,458 filed Oct. 30, 2007, which is a continuation of Ser. No. 11/020,596 filed Dec. 22, 2004 now U.S. Pat. No. 7,634,064, which is a continuation of U.S. application Ser. No. 10/059,905 filed Jan. 29, 2002 now U.S. Pat. No. 6,885,735 that in turn claims priority to U.S. Provisional Application Ser. No. 60/280,379 filed Mar. 29, 2001.

FIELD OF THE INVENTION

This invention relates generally to the field of wireless communication, digital signal processing, and to a system and method for transmitting data derived from a voice input at a remote, mobile location over a wireless data channel.

BACKGROUND OF THE INVENTION

Cellular telephone transmission has long been used in mobile communication. Traditionally, cellular telephone transmission has been used to facilitate conversations between remote individuals. More recently, these same systems have been modified to facilitate the communication of verbal instructions to remote computer systems using speech recognition programs. In these modified systems, the speaker's verbal instructions are converted to digital data instructions, which in turn are used by a computer system to carry out the desired operation. The ability to communicate verbal instructions "hands-free" carries obvious advantages, not the least of which include safety advantages, especially when the speaker is concurrently attempting to operate a vehicle.

The traditional implementation of this type of speech transmission and recognition occurs in one of two ways: (1) sending raw audio (i.e., the speaker's verbal instructions) from a receiver in the vehicle, such as a cellular telephone, to the remote computer system, where the verbal instructions are converted to data instructions; or (2) performing extensive automated speech recognition (ASR) in the receiver (e.g., recognizing words and phrases), and sending the converted digital data instructions to the remote computer system. Both existing implementations suffer from significant disadvantages. Raw audio sent across a cellular network suffers from signal degradation, in turn diminishing the integrity of the audio signal to be converted to digital data instructions and, hence, the accuracy of the ultimate instructions. While converting the audio signal to digital data at the vehicle addresses this problem, it requires expensive computing power in the vehicle, which is logistically and cost prohibitive.

Thus, there is a need for a mobile speech recognition system and method that addresses the disadvantages with the current implementations.

SUMMARY OF THE INVENTION

The present invention provides a voice communication system and method for improving voice recognition processing at a server system that receives voice input from a remotely located user system. The user system includes a microphone configured to receive user voice input, a processor configured to perform front-end voice recognition processing of the received user voice input, and a communication component configured to send the front-end processed user voice input to a destination over a network. The server system includes a communication component configured to receive the sent front-end processed user voice input, and a processor configured to complete voice recognition processing of the sent front-end processed user voice input.

In accordance with further aspects of the invention, the communication component of the user system communicates wirelessly.

In accordance with still further aspects of the invention, the processor of the user system includes a sampling component configured to sample the received user voice input. The processor of the user system further includes at least one of a noise cancellation component, an echo-cancellation component or an end-pointing component.

In accordance with yet other aspects of the invention, the processor of the server includes a component configured to perform a function based on the completed voice recognition processing.

In accordance with still another aspect of the invention, the user system includes removable modules. The modules include a processing module that includes a sampling component configured to sample the received user voice input. Also, the processing module includes a noise cancellation component, an echo-cancellation component or an end-pointing component.

In accordance with still further aspects of the invention, the modules include at least one of a positioning module, a phone adapter module, or a wireless network communication module.

As will be readily appreciated from the foregoing summary, the invention provides an improved system and method for performing voice recognition processing where the processing is performed remote from the person inputting the voice.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
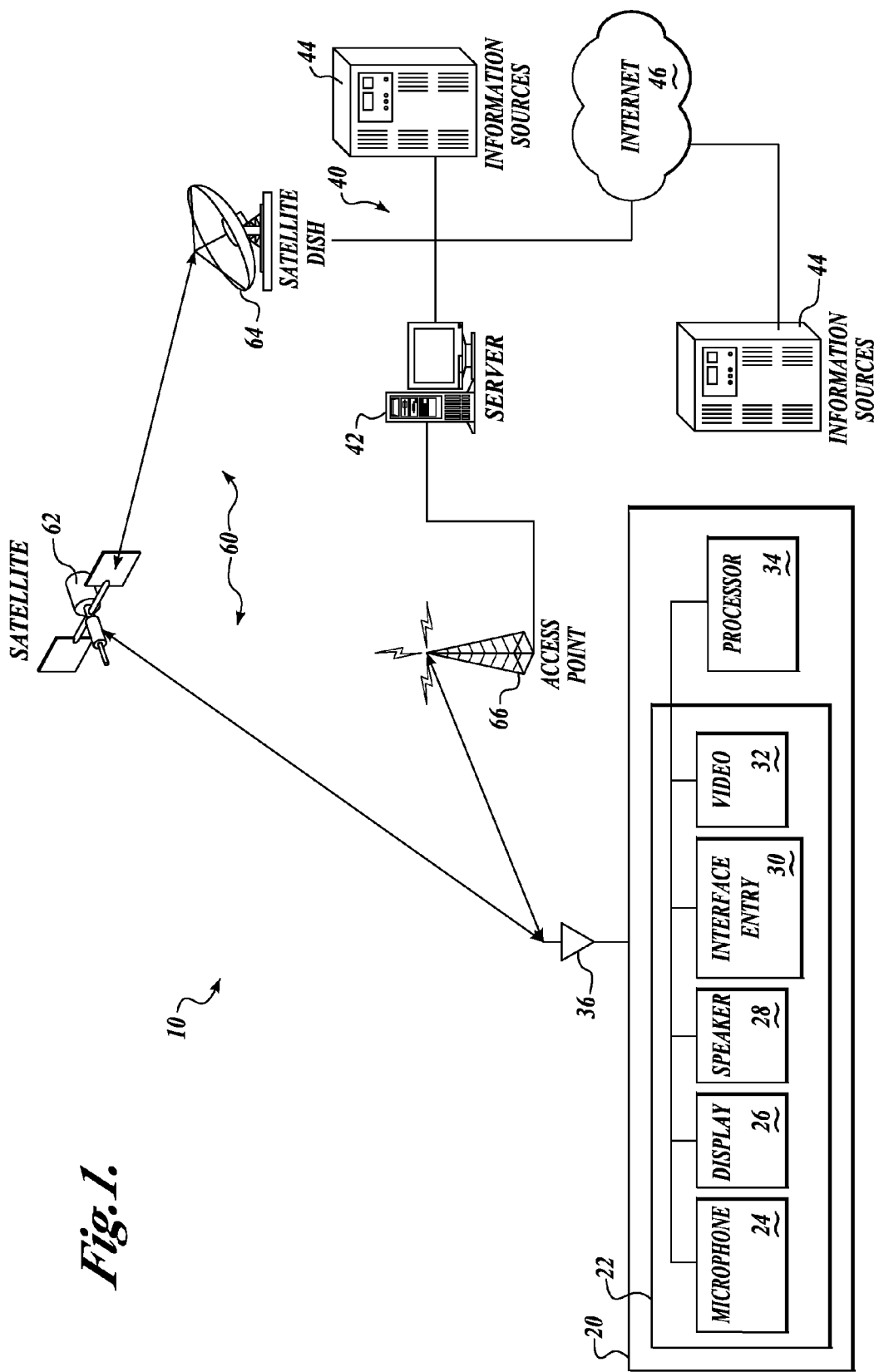
FIG. 1 is a diagram illustrating the general architecture of a mobile speech recognition system that operates in accordance with the present invention.

The present invention provides a system and method for transmitting data derived from voice input at a remote, mobile location over a wireless data channel. By way of overview and with reference to FIG. 1, the mobile speech recognition system 10 of the present invention includes a user system 20 in wireless data communication with a server system 40 via a wireless data channel 60. The invention performs front-end sound processing in user system 20—short of full speech recognition conversion—and sends the results of the sound processing to server 40 in a digital form via wireless data channel 60.

More specifically, FIG. 1 illustrates the particular components of the preferred embodiment of system 10 for sending preprocessed voice over the wireless data channel. User system 20 includes a user interface 22 having a microphone 24 for capturing the user's voice, a display 26, speakers 28, user interface 30 for allowing the user to perform various interactive functions, and preferably a video capture device 32. The user system further includes a voice processor 34 for performing front-end sound processing of the user's voice, and a communications device 36, such as an antenna or other signal carrier, for transmitting and receiving wireless information. User system 20 is preferably implemented in a mobile environment, such as in a car or other vehicle.

In an alternate embodiment, user system 20 includes a processor with memory coupled to multiple controllers (not shown) for receiving data from various vehicle data buses and module receptacles (not shown). The module receptacles are configured to receive various add-on modules, such as modules for coupling other electronic devices, communication modules, processing modules and other modules, such as a phone adapter module, a CPU/memory module, a bluetooth, infrared or wireless network communication module, and a global positioning system (GPS) module. In operation, voice capture and front-end sound processing is accomplished in various modules to the user system. Such modules are replaceable, allowing a user to receive up-to-date sound processing software or other more advanced modules without having to replace any hardware components already installed in the vehicle.

User system 20 is in communication with server system 40. The server system includes a server 42 for housing user system information, as well as processing and responding to requests for information from the user system and information sources 44, which may be integral with or independent from server system 40. The information sources store information subject to requests from the user system. In the preferred embodiment, the server includes a processor, a memory, and a database (not shown). Server 42 may be in communication with information sources 44 via direct access (e.g., hard-wired or point-to-point connection) as well as over Internet 46. Server system 40 further includes a means for sending and receiving information to user system 20, discussed below.

Wireless data channel 60 facilitates communication of instructions and information between user system 20 and server system 40. In a preferred embodiment, the wireless data channel may include a satellite system 62 in combination with a satellite dish 64 along with or in the place of an access point 66, the latter as part of a cellular or other wireless transmission network. In operation, instructions are transmitted from user system 20 via transmission/reception device 34 to either the satellite system or access point, which in turn communicate the instructions to server 42, in the former case via satellite dish 64. Conversely, information may be communicated from the server to the user system along a reverse direction of the same route.

Figure 2:
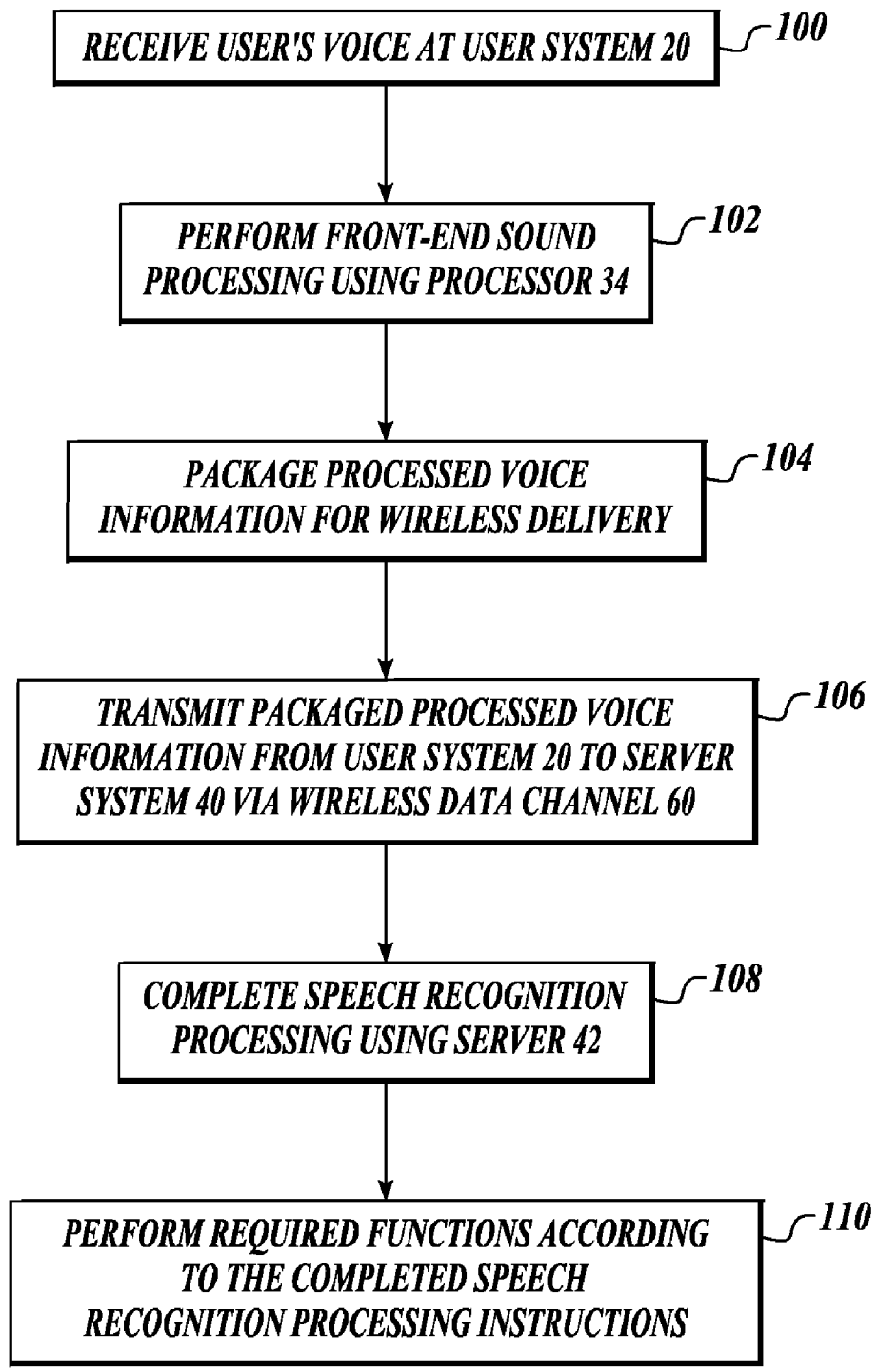
FIG. 2 is a flow chart illustrating the operation of the present invention.

The system and method of the present invention is better understood with reference to FIG. 2, which illustrates the operational steps of the mobile speech recognition system. At block 100, the system receives the user's voice (acoustical audio input) at user system 20. At block 102, the system performs front-end sound processing on the acoustical audio input using processor 34, including converting the audio input to representative digital data. This front-end sound processing is discussed in more detail below with reference to FIG. 3. Once front-end sound processing is complete, at block 104 the system packages the digital data for wireless delivery. At block 106, the system transmits the packaged digital voice information from user system 20 to server system 40 via wireless data channel 60.

At block 108, server system 40 performs complete speech recognition processing on the digital voice information using server 42. As part of this process, the server attempts to match the digital voice information with corresponding digital data entries in the server database, which in turn are associated with a program instructional language. One of three results follow from this process: (1) a match is found, in which case the corresponding program instructions are executed at block 110; (2) no match is found, in which case no instructions are executed (or partial instructions are executed) at block 110; or (3) multiple matches are found. In the last case, the server employs statistical models to decide which of the several matched entries is most probably the desired entry. This statistical modeling may look at previously matched digital voice information and, alone or in context with associated digital voice information, may combine entries in combination to best form appropriate instructional language (e.g., "the chair is white" is more probable than "the chair his white."). The server may also employ grammar, which is a subset of rules associated with the program instructional language, which includes the structure for valid sentences at certain points in the dialog from which the digital voice information was derived. Once the most probable match is determined, the resulting program instructions are executed at block 110.

Figure 3:
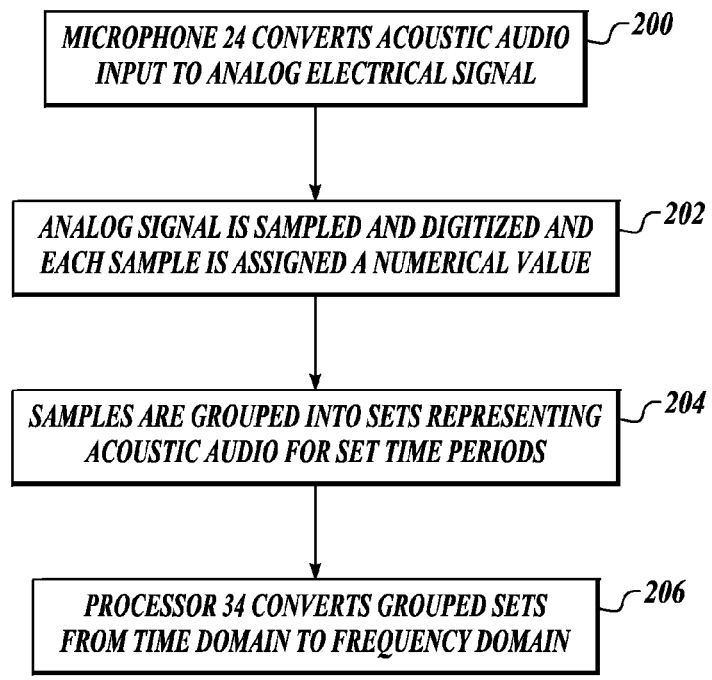
FIG. 3 is a flow chart illustrating the operation of one embodiment of the front-end sound processing aspect of the present invention.

The front-end sound processing of the present invention is better understood with reference to FIG. 3. Microphone 24 of user system 20 captures the user's voice as acoustical audio input. At block 200, this acoustical audio input is converted to an analog electrical signal. At block 202, the analog signal is sampled and digitized. In the preferred embodiment, there are thousands of samples per second. Each sample is assigned a numerical value, which is typically between 0-255 so that it fits in a byte. In an effort to improve the accuracy of the resulting sample, processor 34 performs noise-cancellation, echo-cancellation, and end-pointing routines. Noise-cancellation involves an examination of the amount of energy in the analog signal at various frequencies. Processor 34 detects the background noise accompanying the original signal and subtracts it from the sample. Similar to noise-cancellation, echo-cancellation involves an examination of the amount of energy in the analog signal at various frequencies. With echo-cancellation, the goal is to reduce or eliminate from the sampled signal the vocal system prompt or audio component used by the system to elicit the user's original audio input. By comparing sampled signal components to a data stream representing the system prompt, processor 34 is able to subtract the system prompt and thereby separate the data stream representing the system prompt from the data stream representing the user's audio input. Also, undesired radio signals and other signals that processor 34 knows aren't the user's speech are also removed using the above described technique.

After performing noise- and echo-cancellation, processor 34 looks at the remaining amount of energy at the various frequencies and determines whether it contains actual user audio input, or user speech, as opposed to silence or other non-relevant noise. This is accomplished by examining the energy or amplitude of the audio input and the rate of "zero-crossing." Zero-crossing is where the audio signal changes from positive to negative, or vice versa. When the energy and zero-crossings are at certain predetermined levels, there is a likelihood of occurrence of a speech event.

In an alternate embodiment, processor 34 determines the beginning and end of a spoken phrase. This is performed by the technique known as end-pointing (i.e. speech detection). The determined beginning and end of a spoken phrase constitutes preprocessed information that is sent to server 40.

At block 204, resulting samples are grouped into sets representing acoustic audio for specified time periods. For example, in the preferred embodiment, a group contains all samples in a ten millisecond time period. The groups may have some overlap with respect to samples taken in succession, i.e., group N contains samples from time T to T+10 milliseconds; group N+1 contains samples from time T+8 to T+18 milliseconds, etc. In this example, if 20,000 samples are included per second, each group contains 200 samples.

At block 206, processor 34 converts grouped sets from time domain to frequency domain. In the preferred embodiment, this is accomplished using Fast Fourier Transform: the output of the transformation is a set of numbers, each set representing the amount of audio energy in a frequency band. The width of the frequency bands may be linear or nonlinear. For example, a given set of 10 millisecond time periods will have the following frequency domain values: 150 Hz-300 Hz: 75; 350 Hz-400 Hz: 100; . . . 1000 Hz-1200 Hz: 125 . . . 2500 Hz-3000 Hz: 47. In this example, the low frequency bands are 50 Hz each, while the highest frequency band is 500 Hz.

Figure 4A:
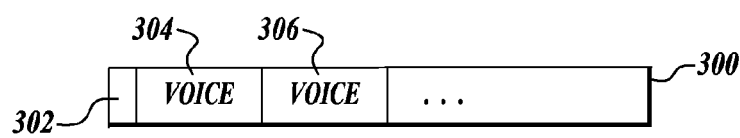
FIGS. 4A-C are block diagrams of data and voice package streams generated by an alternate embodiment of the present invention.
Figure 4B:
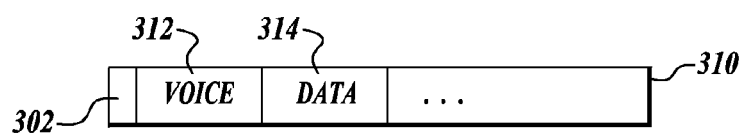
Figure 4C:
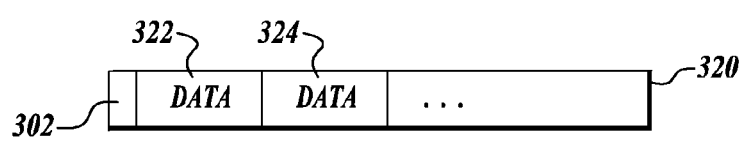

FIGS. 4A-C and 5 illustrate an alternate embodiment of the present invention for metering the deliverable information from user system 20 to server 42. FIGS. 4A-C illustrate packetized data streams 300, 310, 320 that are outputted streams during different modes of operation of user system 20. FIG. 4A illustrates packet stream 300, which includes packets 304, 306 that are filled with voice information. Packet stream 300 also includes an address ID 302 located at the beginning. In this mode of operation, processor 34 has determined that the entire packet stream 300 should be filled with voice information and therefore will populate the packets with only voice information. This mode of operation occurs, for example, when the user is speaking into microphone 24.

FIG. 4B illustrates a second mode of operation for the delivery of information from user system 20 to server 42. In this mode of operation, some packets 312 are filled with voice information and other packets 314 are filled with data, such as GPS or other vehicle information. Processor 34 operates in the mode shown in FIG. 4B in order to deliver user system information along with the sent voice information. Periodically, vehicle information must be sent in order to be processed by the server for various functions. Often times it is desirable that vehicle information be associated with the voice information transmitted at a given time. In one example, a user may verbally request instructions to the nearest gas station, which answer would necessitate knowledge of the vehicle's present location. The present invention may send the voice instruction concurrent with GPS information, ultimately providing server 42 with both pieces of information as part of a nearly simultaneous transmission.

FIG. 4C illustrates a mode of operation that processor 34 executes when no voice is being entered by the user, therefore allowing the entire packet stream 320 to be populated by data as shown in packets 322 and 324.

Figure 5:
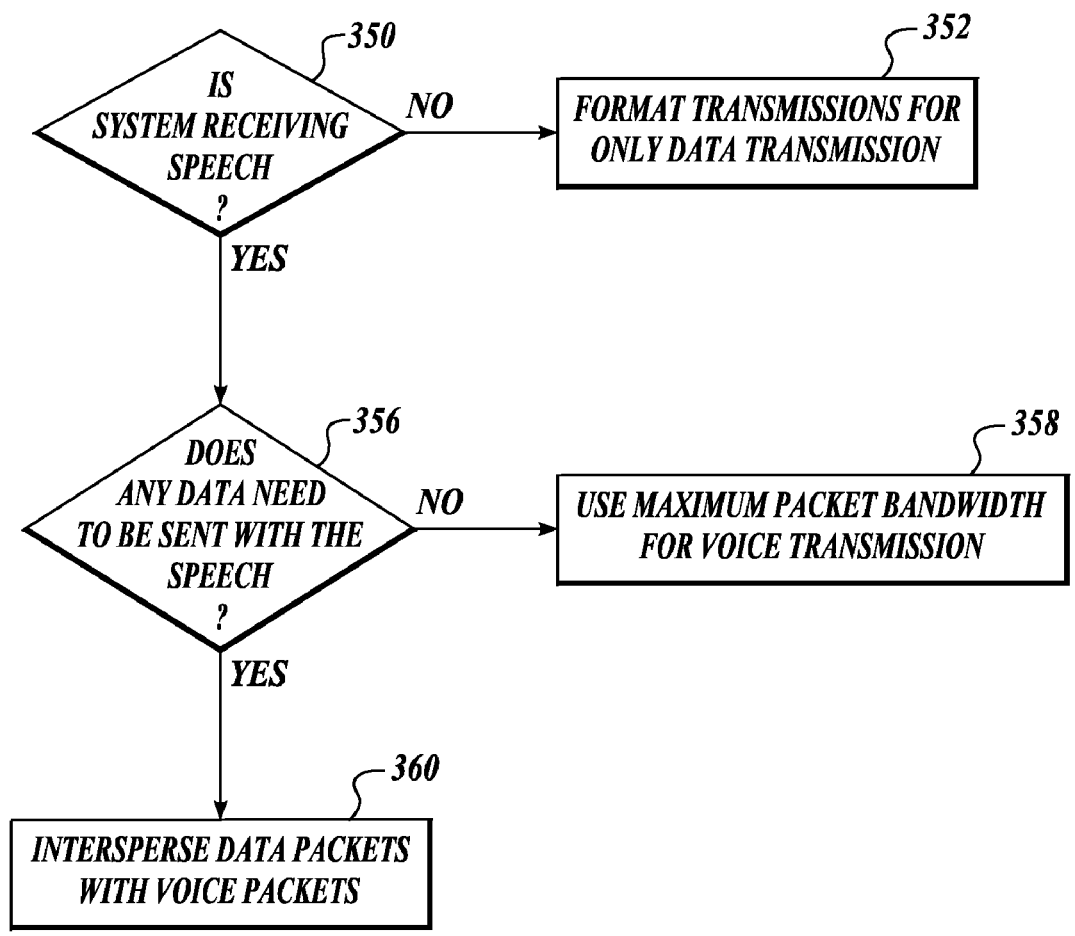
FIG. 5 is a flow diagram.

FIG. 5 illustrates an example decision process performed by processor 34 when deciding how to populate packets sent from user system 20 to server 42. First, at decision block 350, processor 34 determines if user system 20 is receiving speech from the user. If it is determined that no speech is being received, processor 34 formats the transmission to include only data (see block 352), as shown by example in FIG. 4C. If processor 34 determines that user system 20 is receiving speech, the process continues to decision block 356, where the processor determines if any data needs to be sent with the speech. If no data needs to be sent with the speech as determined by processor 34, the processor populates the packets of the transmission with only voice information (see block 358), as shown by example in FIG. 4A. If processor 34 determines that data needs to be sent with the speech, the processor populates some of the data packets with voice and other data packets with data (see block 360), as shown by example in FIG. 4B. When data packets and voice packets are distributed in the transmission, processor 34 populates packets with voice in order to optimize speech recognition at server 42.

While the preferred embodiment of the invention has been illustrated and described, as noted above, many changes can be made without departing from the spirit and scope of the invention. For example, the order of some or all of the front-end sound processing steps may be altered, such as the order in which noise-cancellation and echo-cancellation routines occur. In another example, the sequence used to determine whether input includes speech or data or both may be altered. Accordingly, the scope of the invention is not limited by the disclosure of the preferred embodiment.

The embodiments of the invention in which an exclusive property or privilege is claimed are defined as follows:

1. A method for digital signal manipulation, comprising:
   receiving an acoustic analog signal at a user system;
   converting the analog signal to a digital signal;
   forming a processed digital signal;
   detecting user speech in the processed digital signal;
   if user speech is detected in the processed digital signal;
      packaging the user speech into speech packets to form a packaged voice signal;
      selecting a transmission format compatible with the packaged voice signal; and
   transmitting the packaged voice signal to a server; and
   receiving non-acoustic data at the user system; and
   if user speech is not detected in the processed digital signal,
      packaging the non-acoustic data into data packets to form a packaged data signal;
      selecting a transmission format compatible with the packaged data signal; and
      transmitting the packaged data signal to a server.

2. The method of claim 1, wherein the packaged data signal is transmitted to the server using a maximum possible bandwidth.

3. A method for digital signal manipulation, comprising:
   receiving an acoustic analog signal at a user system;
   converting the analog signal to a digital signal;
   forming a processed digital signal;
   detecting user speech in the processed digital signal; and
   if user speech is detected in the processed digital signal,
      packaging the user speech into speech packets to form a packaged voice signal;
      selecting a transmission format compatible with the packaged voice signal; and
   transmitting the packaged voice signal to a server, wherein if user speech is detected in the processed digital signal, further comprising:
   evaluating the processed digital signal to determine whether data exist that enhances speech detection and matching at the server; and
   if data front the processed digital signal exist to be transmitted to the server to enhance speech detection and matching at the server,
      packaging the data from the processed digital signal into data packets; and
      interspersing data packets with the voice packets.

4. A method for digital signal manipulation, comprising:
receiving an acoustic analog signal at a user system;
converting the analog signal to a digital signal;
forming a processed digital signal;
detecting user speech in the processed digital signal; and
if user speech is detected in the processed digital signal,
  packaging the user speech into speech packets to form a packaged voice signal;
  selecting a transmission format compatible with the packaged voice signal; and
transmitting the packaged voice signal to a server, and if user speech is not detected in the processed digital signal,
receiving non-acoustic data at the user system;
packaging the processed digital signal into data packets to form a packaged data signal;
selecting a transmission format compatible with the packaged data signal; and
transmitting the packaged data signal to a server.

5. The method of claim 4, wherein the packaged data signal is transmitted to the server using a maximum possible bandwidth.

6. A method for digital signal manipulation, comprising:
receiving an acoustic analog signal at a user system;
converting the analog signal to a digital signal;
forming a processed digital signal;
detecting user speech in the processed digital signal; and
if user speech is detected in the processed digital signal,
  packaging the user speech into speech packets to form a packaged voice signal;
  selecting a transmission format compatible with the packaged voice signal; and
transmitting the packaged voice signal to a server, further comprising:
evaluating the processed digital signal to determine whether data exist that enhances speech detection and matching at the server; and
if data from the processed digital signal exists to be transmitted to the server to enhance speech detection and matching at the server,
  packaging the data from the processed digital signal into data packets; and
  interspersing data packets with the voice packets.

* * * * *